Sept. 30, 1958 V. B. GOLD 2,854,561
METHOD OF WELDING
Filed Dec. 23, 1955
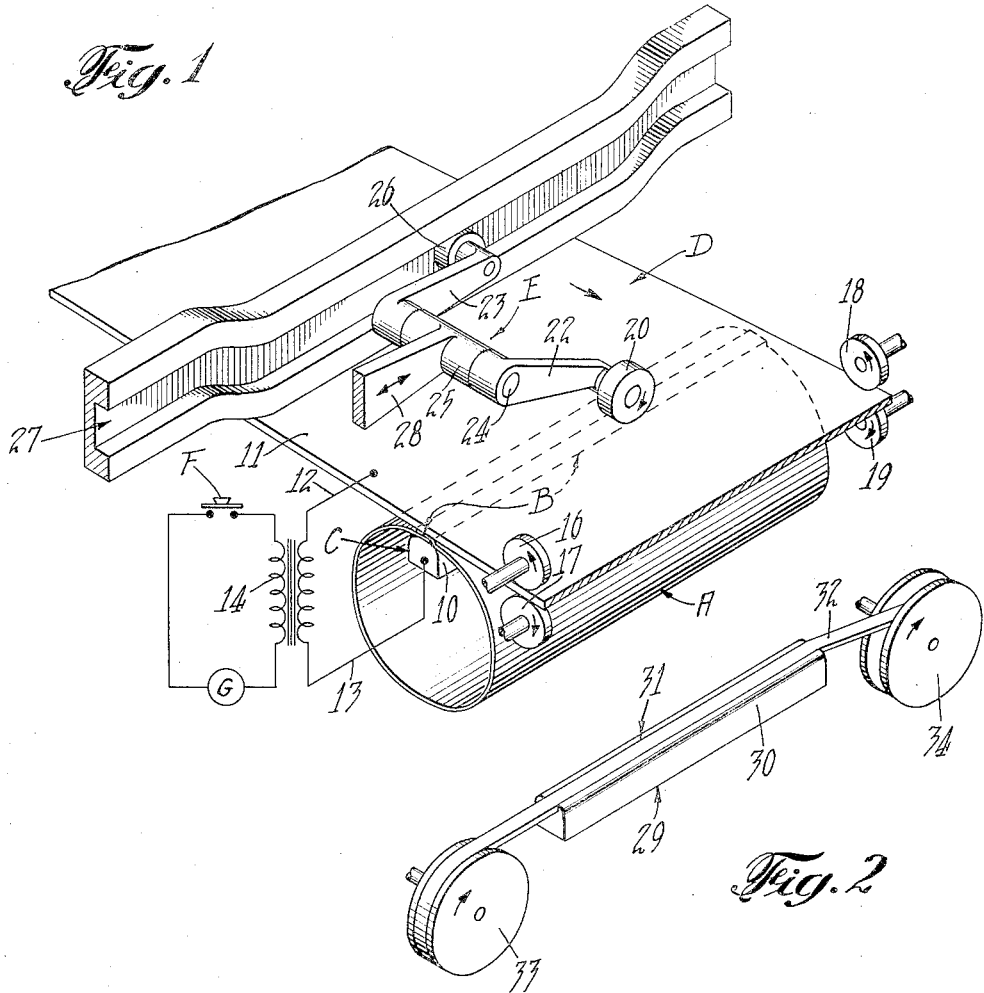
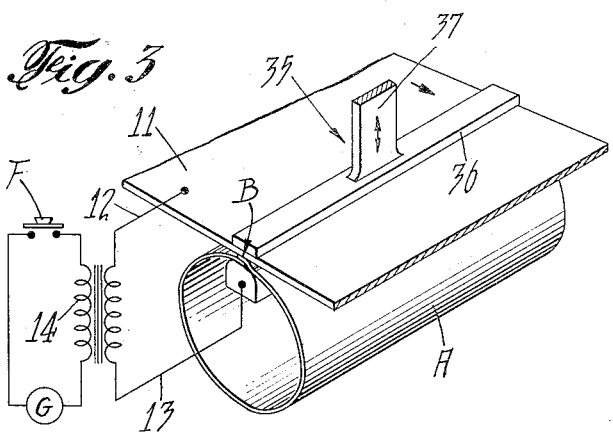
INVENTOR.
VANCE B. GOLD
BY Charles H. Erne
Leland R. McCann
George W. Reiter
ATTORNEYS 2,854,561
Patented Sept. 30, 1958

2,854,561
METHOD OF WELDING

Vance B. Gold, Lombard, Ill., assignor to American Can Company, New York, N. Y., a corporation of New Jersey Application December 23, 1955, Serial No. 555,014

7 Claims. (Cl. 219—83)

The present invention pertains to a method of electric resistance welding and more particularly to the electric resistance welding of the longitudinal seam of a tubular metal object.

It is well known that the welding face of an electric resistance welding electrode deteriorates during use to an extent that poor quality welds are produced. The prior art suggests obviating this difficulty by interposing a quickly and easily renewable surface between the electrode and the work. The present invention provides an improved method of producing a resistance welded seam, not by interposing a renewable surface between the electrode and the work as suggested by the prior art, but by bringing the electrodes, at least one of which is quickly and easily renewable, into direct contact with the work and applying the forging pressure necessary in resistance welding by means of an element separate and distinct from the electrodes.

It is therefore an object of the present invention to provide a method of electric resistance welding wherein relatively frequent shut downs of the equipment to redress and repair various parts thereof, e. g. the electrodes and/or the pressure applying element, are obviated.

Another object of the invention is to provide a method of electric resistance welding wherein the speed at which the welding operation is performed may be greatly increased due to a reduction of the movement of the electrodes and the inertia of the pressure applying element.

A further object of the invention is to provide a method in which no voltage is impressed upon the forging pressure element and therefore no current flows therethrough. Such a mode of procedure enables wide latitude in the design and operation of the forging pressure element because no current carrying power lines are connected to this element. This latitude includes providing the pressure element with the best structural properties for good wear and long life without regard for its electrical properties since it carries no current; and providing a movement for the element, e. g. orbital, reciprocating, oscillating, etc., best suited to the particular welding operation involved.

Yet another object of the invention is to provide a method of electrical resistance welding necessitating relatively very little movement of the electrodes thereby enabling the power lines of the secondary circuit to be rigidly clamped to the electrodes and obviating the need for rolling or sliding contacts in this circuit during the welding operation.

It is also an object of this invention to provide a method of electric resistance welding applicable to the welding of the side seams of sheet metal can bodies efficiently and at high speeds.

Numerous other objects and advantages of the invention will be apparent as it is better understood from the following description, which, taken in connection with the accompanying drawings, discloses a preferred embodiment thereof.

Referring to the drawings:

Figure 1 is a perspective, schematic view of one form of apparatus suitable for carrying out the steps of the present invention;

Fig. 2 is a perspective, schematic view of a modified form of one of the electrodes usable in the invention; and Fig. 3 is a perspective, schematic view of a further modification of an apparatus suitable for use in the invention.

The preferred or exemplary embodiment of the method of the instant invention comprises the steps of providing a tubular, sheet metal can body A (Fig. 1) formed from a flat blank having its longitudinal edges overlapped to form a side seam B to be welded. The seam B, along its entire length, is positioned between a pair of opposed electrodes C, D, electrode D being movable in a direction transverse the seam B. Electrode C may be fixed or movable as desired. If it is movable, it may move in a direction longitudinally of the seam B or transverse thereto as does electrode D, depending upon the shape of the article being welded; for example, the transverse movement of electrode C may be used where the marginal edges of two substantially flat sheets are being welded together, while the longitudinal movement may be used with can body A as shown in the drawings. After the seam B is positioned between the electrodes, some form of a forging pressure applying element which is separate and distinct from the electrodes, such as that generally designated E in Fig. 1, is brought into contact with the surface of electrode D opposite side seam B. Simultaneously with the engagement of element E with electrode D, the primary circuit of a transformer is closed as by a switch F enabling current to flow in the secondary circuit. The element E presses electrode D onto seam B thereby firmly clamping seam B between the electrodes C and D causing welding current to flow between the electrodes and through the seam B. The function of element E is two-fold: i. e. to press the seam B into intimate contact with the electrodes C, D thereby forming a path of least electrical resistance through which the welding current will flow; and to press forcibly together the overlapped edges of the seam B, heated by the passage of welding current therethrough, to fuse them into a single, integral mass. After completion of the weld, the flow of welding current is stopped by opening switch F in the primary circuit and the forging pressure element E is moved out of contact with electrode D thereby releasing can body A and enabling it to be discharged from the welding apparatus. To present a clean, new welding surface free from pits, burns and other unevenness which are likely to cause formation of poor quality welds, electrode D is moved in its transverse direction relative to the position of seam B until a new surface is presented. If the welding surface of electrode C is movable, it also may be moved at the same time electrode D is moved to present, in whole or in part, a clean, new welding surface for welding subsequent seams. Renewing the welding surfaces of the electrodes C and D may be done after the welding of each seam or only after a plurality of welds have been made depending upon the condition of the welding surfaces. After movement of their welding surface, the electrodes C, D are fixed in position and the steps set forth above are repeated.

In the exemplary apparatus disclosed in the drawing for carrying out the instant method, the tubular sheet metal can body A is positioned in the welding station with its side seam B disposed between the opposed electrodes C, D, consisting of a fixed electrode 10 and a movable electrode 11 respectively. Electrodes 10 and 11 are connected by suitable power cables 12 and 13 respectively to the secondary winding in the transformer 14, the primary winding of which is supplied with current from a suitable source such as a generator G. To prevent current from flowing between the electrodes and through seam B before commencement of the welding operation, the primary circuit is provided with a switch F which is closed only when pressure applying element E is compressing seam B between electrodes 10, 11 and is open at all other times.

The fixed electrode 10 which is disposed within can body A is in the shape of a bar extending the full length of side seam B and abutting side seam B on the inside thereof. Except for the width of the bar which actually contacts the inside of side seam B and is substantially flat, the upper surface of the bar or that surface which is adjacent the side seam may be arcuate in shape so as to conform to the inside contour of can body A.

In accordance with the present invention, the movable electrode 11, disposed outside of the can body A, is in the shape of a thin, substantially flat strip or sheet of electrically conductive material. The width of this sheet or strip is at least equal to the length of side seam B and may be of a width slightly greater than the length of side seam B so that there is present at each end of the side seam a slight overhang of electrode 11. This latter arrangement facilitates completely covering seam B with electrode 11 and obviates the necessity of carefully aligning the side edges of electrode 11 with the ends of seam B.

The movable electrode 11 may be as long as desired, but it is necessary that its length be considerably greater than the width of the weld. Electrode 11 is mounted so as to be movable in a direction transverse the position assumed by seam B while it is being welded. This movement may be accomplished by any suitable means such as the two pairs of opposed rollers 16, 17 and 18, 19. As the narrow segment of electrode 11 becomes worn due to the welding operation, electrode 11 is intermittently shifted in its transverse direction so as to provide a completely new welding surface for subsequent welding operations. It has been found that each increment of electrode 11 can be used a plurality of times before necessitating the shifting of the electrode to present a new and clean surface. Also depending upon the width of the weld being formed, electrode 11 need be moved only a short distance to completely replace the old welding surface with a new welding surface. Because of these facts relatively little movement or shifting of the electrode 11 is required, even when the welding operation is continuous over a long period of time. This relative slight movement of the movable electrode 11 enables power cable 12 to be attached to electrode 11 in a positive, rigid connection. In electrical operations such as direct current resistance welding wherein the power lines carry very high currents, such positive connections are far more efficient and desirable than rolling or sliding contacts. Further, electrode 11, if desired, could be redressed at some point remote from the welding operation and without interfering with the welding. Thereafter it could be returned to the welding operation for repeated use. Operating in this manner and/or by splicing a completely new electrode sheet onto a non-reusable electrode sheet, it would never be necessary to discontinue the welding operation for the purpose of replacing or redressing the electrode.

The exemplary pressure applying element E shown in the accompanying drawing comprises a roller 20 rotatably mounted on one end of an arm 22. Roller 20 is electrically insulated to prevent the passage of welding current therethrough and the grounding of the current on the body of the machine. Arm 22 is connected to a lever 23 by means of a short shaft 24 rotatably mounted in a bearing 25. On the end lever 23 remote from shaft 24, there is mounted a rotatable cam follower 26 which rides in a cam groove 27. By a suitable mechanism (not shown) acting through an arm 28 attached to bearing 25, the forging pressure applying element E is progressively moved along the length of the side seam B. As the element E approaches the seam to be welded (from the left as viewed in Fig. 1) cam follower 26 rides downwardly in the cam groove 27 thereby rotating lever 23 and also arm 22 acting through shaft 24 in a clockwise direction. This action presses roller 20 into engagement with the upper surface of the movable electrode 11 with a predetermined optimum amount of pressure. This predetermined pressure application is substantially uniformly maintained along the entire length of seam B, even at the very extremities of the seam, thereby producing a weld of substantially uniform, optimum quality. As stated hereinabove, switch F is closed, enabling current to flow between the electrodes, simultaneously with the engagement of roller 20 with that portion of electrode 11 overlying seam B and thusly with the initial exertion of pressure on seam B.

As wheel 20 rolls over the surface of electrode 11 opposite side seam B from one end of the seam to the other, it applies forging pressure to the outer surface of electrode 11 along a locus of points forming a straight line, each point of contact being released as the subsequent point is engaged. Welding current will flow between electrodes 10, 11 at the point of contact of roller 20 with electrode 11, thereby causing the weld in seam B to progress beneath roller 20 as its progresses. Since the quality of the weld depends upon the amount of current flowing between the electrodes which in turn will depend—for a given uniform current input—upon the force with which wheel 20 compresses seam B between the electrodes, to insure a weld of uniformly optimum quality along the entire length of seam B, it is necessary that the compressing force be uniformly constant along the length of seam B.

At the terminal end of the weld, i. e. the right side of seam B as viewed in Fig. 1, roller 20 is lifted from engagement with electrode 11 by the coaction of cam follower 26 riding in cam groove 27 which rotates lever 23 and thereby arm 22 in a counterclockwise direction. As roller 20 moves out of contact with electrode 11, or preferably a split second before so as to prevent arcing, switch F is opened causing the welding current to decrease to zero as roller 20 moves off of the end of seam B, i. e. the right end as viewed in Fig. 1.

Because, according to the present invention, the forging pressure applying element functions independently of the electrodes and therefore is free of any electrical connections, a variety of movements thereof may be used. For example, the element E may be reciprocated in the opposite direction in order to weld the next succeeding seam in the reverse direction from that described above. If desired, the element E may be moved to its starting position, i. e. to the left as viewed in Fig. 1, during the interval between can bodies by reciprocating the element or by moving it in an orbital path so that welding of subsequent seams takes place in one direction only. Further, a plurality of elements E could be arranged to travel in an orbital path, each element applying forging pressure to a seam in sequence.

The inside electrode 29 disclosed in Fig. 2 is a modified form of the fixed electrode 10 shown in Fig. 1. The body 30 of electrode 29 is similar in size, shape, material and electrical connection to that of electrode 10. In the upper surface of the body 30 which is contiguous the inside surface of side seam B, there is a longitudinal groove 31 of predetermined width and depth. A movable electrode element or wire 32 having a width equal to the width of the seam to be welded, is disposed along the length of groove 31 for sliding movement therethrough. The current lead is connected to body 30 and strip 32 makes contact therewith during welding by being pressed against the base of slot 31 through the action of pressure applying element E. The electrode strip or wire 32 is substantially flat on its upper, seam-engaging surface and may or may not as desired, extend above the contour of body 30. This construction enables the welding surface of electrode 29 to be readily and easily renewed, in whole or in part, between the welding of succeeding seams. After the completion of the weld of side seam B, and the release of forging pressure applied by element E, strip or wire 32 can be moved longitudinally through slot 31 by a suitable mechanism, such as winding the strip off of reel 33 and on to reel 34. The strip may be moved a distance equal to the length of the electrode body 30 whereby an entirely new electrode surface is presented for the welding of subsequent seams; or it may be moved for any part of this distance so that for each succeeding weld, a welding surface that is partially new and partially used is presented. As with the electrode sheet 11, strip 32 may be in the form of an endless belt that is continuously redressed at some point remote from the welding operation and continuously returned to perform its electrode function.

Fig. 3 discloses a pressure applying element generally designated 35, which is a modification of pressure applying element E shown in Fig. 1. A pressure applying shoe 36 attached to and electrically insulated from a slide member 37 adapted to be reciprocated up and down by any suitable mechanism (not shown) applies pressure along the entire length of side seam B simultaneously. As with wheel 20, shoe 36 must apply pressure uniformly along the length of seam B so as to produce a weld of uniformly optimum quality. However, the action of shoe 36 differs from the action of wheel 20 in that shoe 36 applies pressure to the seam all at once and thereby produces a "one shot" weld as opposed to the progressive weld produced by wheel 20. In order to prevent arcing, switch F is not closed and therefore current does not flow between the electrodes until shoe 36 is exerting maximum pressure on electrode 11. For the same reason, switch F is opened thereby stopping the flow of current just prior to the movement of shoe 36 away from electrode 11. In all other respects, the operation and structure of the device shown in Fig. 3 is the same as that shown in Fig. 1.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the process hereinbefore described being merely a preferred embodiment thereof.

I claim:

1. A method of forming a welded seam by electric resistance welding comprising, interposing a seam to be welded between a pair of opposed electrodes connected to conductors for carrying welding current, one of said electrodes being substantially flat and movable laterally relative to said seam, holding said seam and said movable electrode in a fixed position, moving a pressure applying element into engagement with the surface of said movable electrode opposite said seam for clamping said seam between both of said electrodes, passing welding current from said conductors to said electrodes through rigid non-sliding contacts therebetween and thereby through said seam while said seam is clamped between said electrodes to form a weld, and thereafter moving said movable electrode in said lateral direction so that a new electrode surface of said movable electrode is presented for the welding of subsequent seams.

2. A method of forming a welded seam by electric resistance welding comprising, interposing a seam to be welded between a pair of electrodes, one of said electrodes being laterally movable relative to its opposite electrode, holding said seam and said movable electrode in a fixed position, continuously applying forging pressure over the surface of said movable electrode opposite said beam along the length of said seam for progressively clamping said seam between both of said electrodes, passing welding current between said electrodes and thereby through said seam while said seam is clamped between said electrodes to form a weld, and thereafter moving said movable electrode in said lateral direction so that a new surface of said movable electrode is presented for the welding of subsequent seams.

3. A method of forming a welded seam by electric resistance welding comprising, interposing a seam to be welded between a pair of opposed electrodes, one of said electrodes being substantially flat and laterally movable in a direction transverse said seam, holding said seam and said movable electrode in a fixed position, rolling a pressure applying element over the surface of said movable electrode opposite said seam along the length of said seam for progressively clamping said seam between both of said electrodes, passing welding current between the electrodes and thereby through said seams while said seam is clamped between said electrodes to form a weld, and thereafter moving said movable electrode in said transverse direction so that a new surface of said movable electrode is presented for the welding of subsequent seams.

4. A method of forming a welded seam by electric resistance welding comprising, interposing a seam to be welded between a pair of opposed electrodes connected to conductors for carrying welding current, one of said electrodes being movable in a direction transverse said seam, holding said seam and said movable electrode in a fixed position, moving a pressure applying element into engagement with said movable electrode simultaneously along the whole length of said seam for clamping the whole length of said seam between both of said electrodes, passing welding current from said conductors to said electrodes through rigid non-sliding contacts therebetween and thereby through said seam while said seam is clamped between said electrode to form a weld, and thereafter moving said movable electrode in said transverse direction so that a new surface of said movable electrode is presented for the welding of subsequent seams.

5. A method of forming a welded seam by electric resistance welding comprising, interposing a seam to be welded between and contiguous a pair of opposed electrodes, one of said electrodes being movable in a direction transverse said seam and the other of said electrodes being movable in a direction longitudinally of said seam, holding said seam and said electrodes in a fixed position, moving a pressure applying element into engagement with one of said electrodes for clamping said seam between both of said electrodes, passing welding current between said electrodes and thereby through said seam while said seam is clamped between said electrodes to form a weld, and thereafter moving each of said electrodes in its respective direction so that a new surface is presented on each of said electrodes for welding subsequent seams.

6. The method set forth in claim 5 in which the pressure applying element is moved into engagement with said transversely movable electrode.

7. The method of electric resistance welding the longitudinal seam of a tubular metal article comprising, interposing said longitudinal seam along its entire length between and contiguous a pair of substantially flat opposed electrodes, one of said electrodes being disposed inside of said article and movable in a direction longitudinally of said seam, the other of said electrodes being disposed outside of said articles and movable in a direction transverse said seam, holding said seam and said electrodes in a fixed position, rolling a pressure applying element over the surface of said outside electrode opposite said seam along the length of said seam for progressively clamping said seam between both of said electrodes, passing welding current between said electrodes and thereby through said seam while said seam is clamped between said electrodes to form a weld, and thereafter moving said outside electrode in said transverse direction and said inside electrode in said longitudinal direction so that a new surface is presented on each of said electrodes for welding subsequent seams.

References Cited in the file of this patent

UNITED STATES PATENTS

| | | |
|---|---|---|
| 1,300,603 | Gravell | Apr. 15, 1919 |
| 1,308,778 | Gravell | July 8, 1919 |
| 2,599,045 | Brolaski | June 3, 1952 |

FOREIGN PATENTS

| | | |
|---|---|---|
| 221,651 | Switzerland | June 15, 1942 |